Dec. 16, 1958  H. H. WOODWORTH, JR  2,864,355
CARBURETOR HEAT EXCHANGER

Filed July 23, 1957  2 Sheets-Sheet 2

Inventor
Harmon H. Woodworth, Jr.
Paul O. Pippel
Attorney

United States Patent Office 2,864,355
Patented Dec. 16, 1958

2,864,355

CARBURETOR HEAT EXCHANGER

Harmon H. Woodworth, Jr., Lake Bluff, Ill., assignor to The Frank G. Hough Co., a corporation of Illinois Application July 23, 1957, Serial No. 673,652

3 Claims. (Cl. 123—122)

This invention relates generally to carburetor assemblies and more specifically to improved means for preventing icing or frosting of a portion of a carburetor assembly.

As is known in the art, the carburetor assemblies that are used with gasoline engines are subject to icing or frosting in the portion thereof adjacent to the carburetor venturi, and air flow control valves. This icing or frosting is caused by the freezing of water vapor present in the air drawn into the carburetor, which air is drastically cooled by the evaporation of gasoline in the area of the venturi and the air control valves of the carburetor. It has been found that this frosting will occur under certain conditions when the ambient temperature is as high as 80° F.

This frosting or freezing of water vapor adjacent the venturi causes unsatisfactory performance of the carburetor in that the valves may be caused to stick and the proper amount of air flow through the carburetor passageways is seriously retarded.

It is the object of the present invention to provide means for heating a carburetor assembly to prevent icing or frosting of the carburetor or components of the air intake system.

It is a further object of the invention to provide certain heating means in the vicinity of the venturi of a carburetor for a gasoline engine which will prevent the formation of ice on the surfaces of the carburetor system adjacent the venturi.

It is a further object of the present invention to provide means for a gasoline engine having a governor valve box and carburetor assembly which is mounted between the governor valve box and the carburetor and which will function to prevent any frosting or icing of the surfaces in the region of the junction of the governor valve box in the carburetor.

It is a feature of the present invention that the means provided for heating further uniquely functions as a gasket.

Other objects and features of the present invention will be apparent upon a perusal of the following specification and drawings of which:

Figure 1:
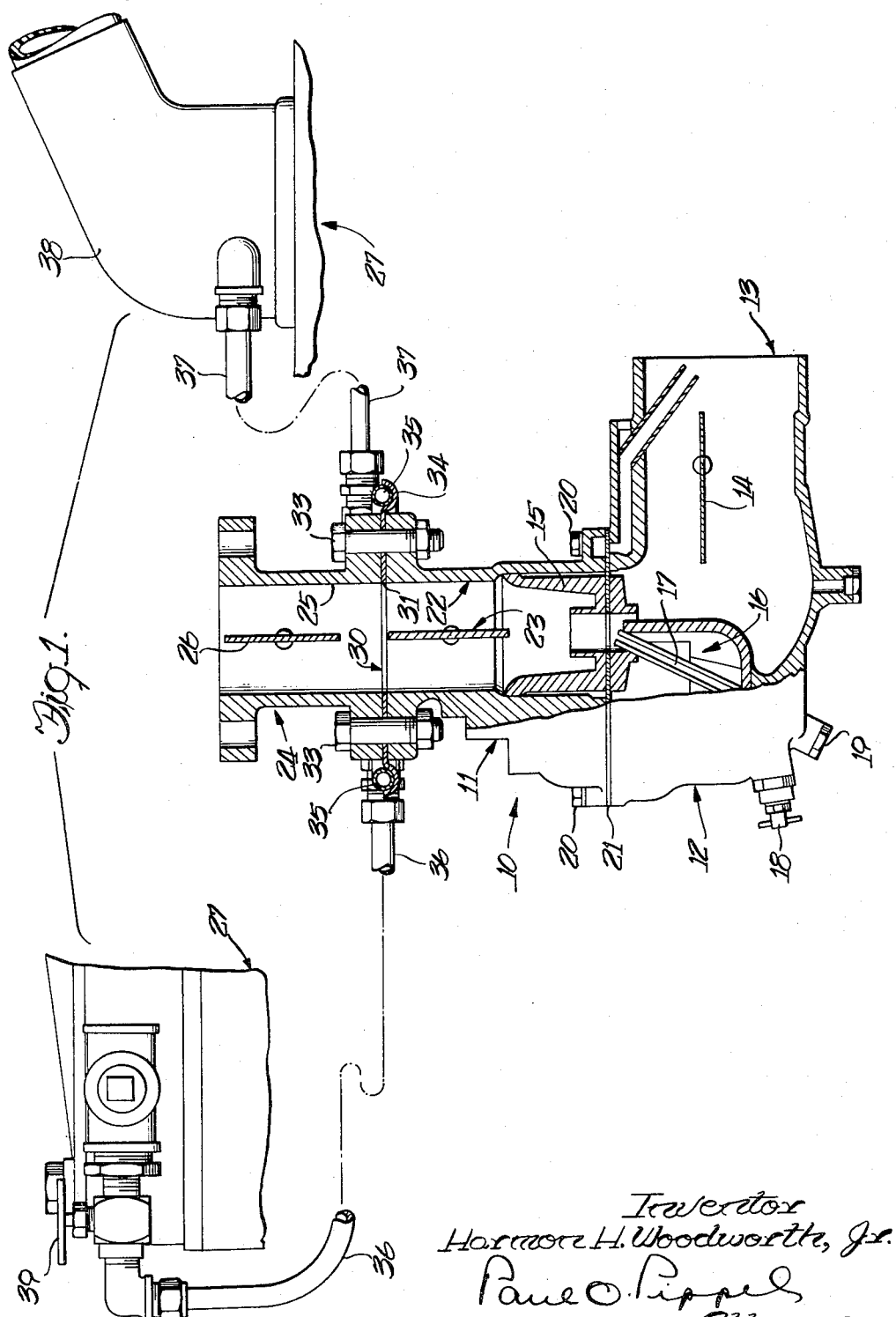
Figure 1 is a side elevational view of a carburetor and governor valve box assembly partially in cross section and further showing two portions of a gasoline engine.
Figure 2:
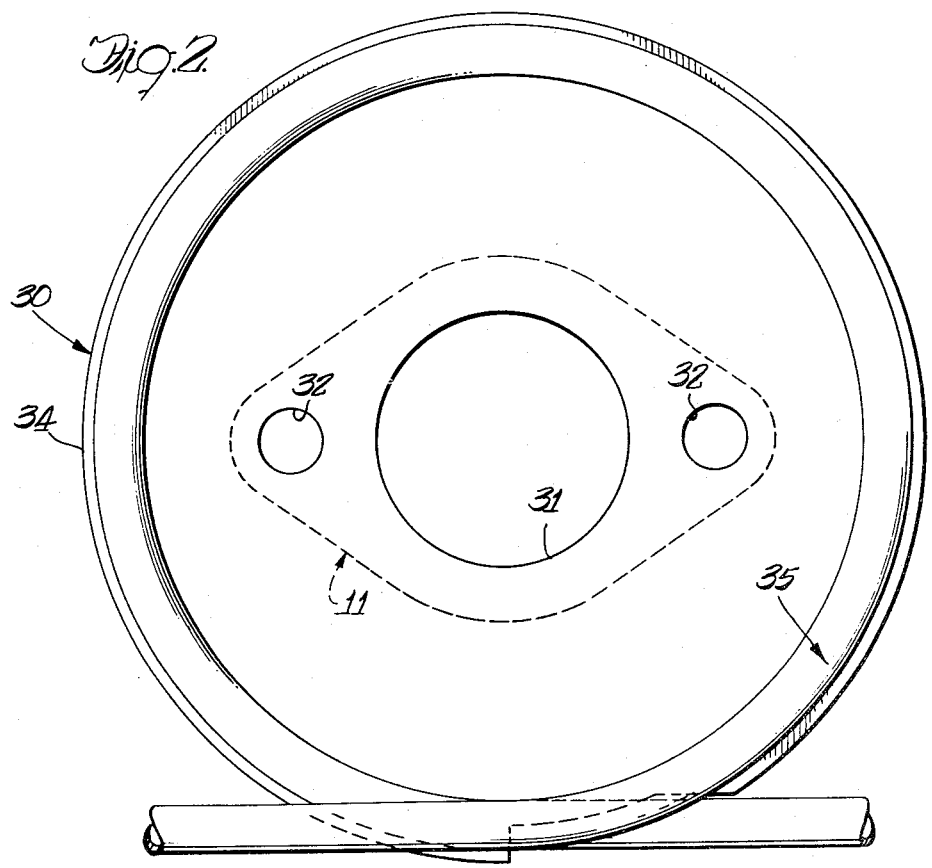
Figure 2 is an enlarged top plan view of a portion of the heating means for carburetor assembly.
Figure 3:
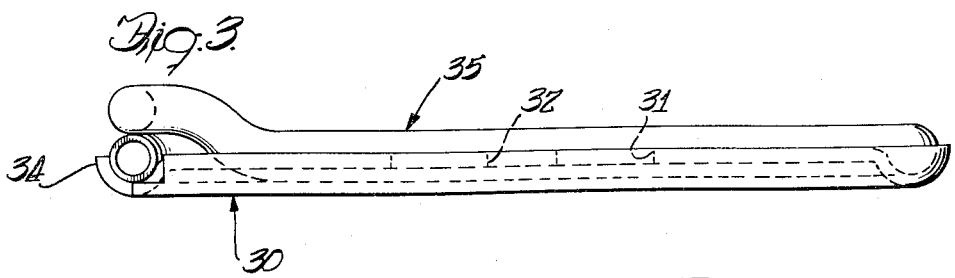
Figure 3 is a side elevational view of the structure shown in Figure 2.

The present embodiment is the preferred embodiment but it is to be understood that changes can be made in the present embodiment by one skilled in the art without departing from the spirit and scope of the present invention.

Generally the present invention comprises a relatively soft metal plate which is a good thermal conductor, a hot water tubing system mounted thereto with the entire arrangement secured between the governor valve box and the carburetor adjacent the carburetor venturi, with the metal plate functioning as a gasket and a heat exchanger to heat the surfaces surrounding the venturi and thereby prevent any frosting thereof.

For a detailed description of the invention reference is made to the drawings. The carburetor 10 comprises an upper air-gasoline mixing portion 11 and a lower housing portion 12 which includes an air horn 13 whereby air for mixture with the gasoline is drawn into the carburetor. The amount of air drawn into the passageway 13 is regulated by an air shutter plate 14 which is pivotally mounted in the passageway 13 and is adjustable therein to vary the effective area of the passageway 13. The air drawn through the passageway 13 then enters the venturi 15 mounted in the lower end of the gasoline air mixing portion 11. The lower housing 12 further includes a fuel flow chamber 16 containing liquid gasoline from which the gasoline is delivered through a metering tube 17 having its outlet end positioned at the inlet to the venturi 15. The amount of gasoline delivered through the metering tube 17 is varied by suitable adjustments 18 and 19 provided on the lower housing 12. Thus it may be seen that the air from the passageway 13 and the gasoline from the metering tube 17 together pass into the venturi 15. The gasoline-air mixing portion 11 forming the upper housing of the carburetor 10 is secured to the lower housing 12 by means of bolts 20 and the region of the venturi 15 is sealed from any air leakage externally of the carburetor 10 by means of a gasket 21 mounted between the upper portion 11 and the lower housing 12 of the carburetor 10. The upper portion 11 of the carburetor 10 includes a cylindrical passageway 22, across the bottom end of which the venturi 15 is mounted. A throttle plate 23 is pivotally mounted in the passageway 22 and is operable to vary the effective area of the passageway 22. The governor valve box 24 is secured on the upper end of the upper portion 11 of the carburetor 10. The governor valve box 24 includes a cylindrical passageway 25 in axial alignment with the passageway 22 of the upper portion 11 of the carburetor 10. A governor valve plate 26 is pivotally mounted in the passageway 25 of the governor valve box 24 and is adjustable therein to vary the effective area of the passageway 25.

In operation, air is drawn through passageway 13 and moves into passageway 22 adjacent the venturi 15. Gasoline passes from the metering tube 17 into the area of the venturi 15 and due to the low pressure created by the venturi, a vaporization and evaporation of the gasoline takes place in the air passing therethrough. From the passageway 22, the gasoline-air mixture passes through the governor valve box passageway 25 and from there into the intake manifold (not shown) of the gasoline engine 27 of which two small portions are shown in Figure 1. The amount of air traveling through passageway 13 will be dependent upon the adjustment of the air shutter plate 14. The amount of air-gasoline mixture passing into the governor valve box passageway 25 will be dependent upon the operation of the throttle plate 23, and the amount entering the intake manifold of the engine will be dependent upon the degree of operation of the governor valve plate 26. The evaporation of gasoline in the area of the venturi 15 causes a substantial drop in temperature in that area tending to produce frost on the surfaces of the passageways 22 and 25 and on the throttle plate 23 and the governor plate 26.

A plate 30 formed of relatively soft metal such as copper is provided. A metal such as copper is selected because of its good thermal conductivity. The plate 30 is circular and has an opening 31 therethrough of the same diameter as the passageways 22 and 25 of the carburetor 10 and governor valve box 24. The plate 30 is also provided with a pair of holes 32 so that the plate 30 may be inserted between the governor valve box 24 and the carburetor 10 and the openings 32 will be in axial alignment with the mounting holes in the lower portion of the governor valve box 24 and the upper end of the carburetor 10. Suitable nuts and bolts 33 are then mounted through these openings securing the governor valve box 24 to the upper end of the carburetor 10. By tightly drawing up on the nuts and bolts 33, the lower surface of the governor valve box 24 and the upper surface of the carburetor 10 may be caused to bite into the relatively soft copper of the plate 30 thereby providing an efficient gasket against the leakage of any air from externally of the governor valve box 24 and carburetor 10 into the passageways 22 and 25. Further, this securing of the nuts and bolts 33 provides good thermal contact between the plate 30 and the adjacent surfaces of the governor valve box 24 and the carburetor 10. The outer periphery of the plate 30 is formed as a portion of a curved trough 34. A length of copper or other metal tubing 35 is mounted within the curved trough 34 of the plate 30 in good thermal contact therewith and is secured therein by some means such as soldering. The tubing 35 traces a complete loop about the plate 30 and each end of the tubing 35 is connected to other tubings 36 and 37.

The two portions of the engine 27 shown in Figure 1 are portions on each side of the water pump for the engine, with the flange 38 carrying cooling water from the outlet side of the water pump and with the shut-off cock 39 connected into passageways on the suction side of the water pump. One end of the tubing 36 is connected to the shut-off cock 39 and the other end of the tubing 36 is connected to one end of the tubing 35. The other end of the tubing 35 is connected to tubing 37, and the other end of tubing 37 is connected to the flange or thermostat housing 38. Thus it may be seen that dependent upon the degree to which the shut-off cock 39 is opened, hot water from the engine 27 will pass through shut off cock 39, tubing 36, tubing 35, tubing 37, to the engine 27. As this water passes through tubing 35, heat therefrom will pass through tubing 35, through the curved trough 34 of the plate 30, through the plate 30, and to and through the body of the governor valve box 24 and the upper portion 11 of the carburetor 10. This heat will raise the temperature of the surfaces of the passageways 22 and 25 and the adjacent parts to a degree sufficient to prevent the formation of any ice or frost thereon. In the use of the present invention, it has been found that the transfer of heat from the water to the tubing 35, the plate 30, the carburetor 10 and the governor valve box 24 is very efficient and rapid, and effectively operates to prevent any formation of frost or icing under extreme conditions of humidity and temperature. Further, the plate 30 effectively functions as a gasket preventing any air leakage between the governor valve box 24 and the upper portion 11 of the carburetor 10.

Having described the invention, what is considered new and desired to be protected by Letters Patent is:

1. A heater and gasket member for a carburetor and governor valve assembly wherein a passageway is formed through said carburetor and said governor valve, said heater and gasket member comprising a circular plate having an opening therethrough, said opening being formed of the same diameter as said passageway, said plate being formed of a relatively soft material having a high thermal conductivity, said plate mountable between said carburetor and said governor valve in good thermal contact and air sealing relationship therewith with said opening in alignment with said passageway, and means mounted to the outer portions of said plate for heating said plate.

2. A heater and gasket member for a carburetor and governor valve assembly wherein a passageway is formed through said carburetor and said governor valve, said heater and gasket member comprising a circular plate having an opening therethrough, said opening being formed of the same diameter as said passageway, said plate being formed of a relatively soft material having a high thermal conductivity, said plate mountable between said carburetor and said governor valve in good thermal contact and in an air sealing relationship therewith with said opening in alignment with said passageway, and means for heating said plate comprising a length of tubing secured to said plate in a good heat exchange relationship, and means connected to said tubing for conducting a heating fluid therethrough.

3. A heater and gasket member for a carburetor and governor valve assembly wherein a passageway is formed through said carburetor and said governor valve, said heater and gasket member comprising a circular plate having an opening therethrough, said opening being formed of the same diameter as said passageway, said plate being formed of a relatively soft metal having a high thermal conductivity, said plate mountable between said carburetor and said governor valve in good thermal contact and in an air sealing relationship therewith with said opening in alignment with said passageway, the outer periphery of said plate being formed in the shape of a trough having a certain curvature, a length of tubing mounted in said trough in good thermal contact therewith, and means connected to said tubing for conducting a heating fluid therethrough.

References Cited in the file of this patent

UNITED STATES PATENTS 1,822,147     Horning  ---------------- Sept. 8, 1931